United States Patent
Xiong et al.

(10) Patent No.: US 7,630,722 B2
(45) Date of Patent: Dec. 8, 2009

(54) LOCATION REQUEST METHOD AND APPARATUS IN WIRELESS COMMUNICATIONS NETWORKS AND DEVICES

(75) Inventors: Michelle Hao Xiong, Vernon Hills, IL (US); Eric J. Hefner, Gurnee, IL (US)

(73) Assignee: Motorola, Inc., Schaumburg, IL (US)

( * ) Notice: Subject to any disclaimer, the term of this patent is extended or adjusted under 35 U.S.C. 154(b) by 104 days.

(21) Appl. No.: 11/066,090

(22) Filed: Feb. 25, 2005

(65) Prior Publication Data

US 2006/0194591 A1    Aug. 31, 2006

(51) Int. Cl.
*H04Q 7/20* (2006.01)
(52) U.S. Cl. .................. 455/456.2; 455/456.3
(58) Field of Classification Search ........... 455/67.1, 455/418, 419, 423, 425, 456.3, 433
See application file for complete search history.

(56) References Cited

U.S. PATENT DOCUMENTS

2001/0049263 A1* 12/2001 Zhang ..................... 455/67.1
2004/0229632 A1* 11/2004 Flynn et al. ............. 455/456.3

OTHER PUBLICATIONS

3GPP TS 24.030 V3.3.0; (Dec. 2001) Location Services (LCS); Supplementary Service Operations - Stage 3; 9 pages (Release 1999).
3GPP TS 24.080 V3.7.0; (Jun. 2002) Mobile Radio Interface Layer 3 Supplementary Services Specification; Formats and Coding; 52 pages (Release 1999).

* cited by examiner

*Primary Examiner*—Lester Kincaid
*Assistant Examiner*—Phuoc Doan
(74) *Attorney, Agent, or Firm*—Gary J. Cunningham

(57) ABSTRACT

A method and apparatus for suppressing subsequent re-request of a location request, for example a MO-LR request in a GSM communication system, by a mobile station (MS) (110) to the network. The method in the mobile station comprises transmitting (302) a location request message to a network. Then, at the MS, determining (304) that the network can not provide the requested location information. Creating (306) an indicator in a memory of the device that the network is not capable of providing the requested location information and finally suspending (308) subsequent transmission of location request message to the network.

16 Claims, 4 Drawing Sheets

LOCATION REQUEST METHOD AND APPARATUS IN WIRELESS COMMUNICATIONS NETWORKS AND DEVICES

FIELD OF THE INVENTIONS

The present inventions relate generally to wireless communications location services, and more particularly to the avoidance of a location re-request by wireless communications devices, and the methods and apparatus therefore.

BACKGROUND OF THE INVENTIONS

Mobile wireless communications subscriber devices and cellular subscriber communications networks are increasingly providing and supporting technologies that enable location determination of the subscriber devices, for example, for compliance with the emergency location services, like E-911 mandated by the Federal Communications Commission, and increasingly for location-based e-commerce services and applications.

Many communications networks however do not support location technologies, and some networks support one technology but not others. Thus many subscriber devices may perform location measurements or computations that are not required by a particular network, resulting in unnecessary power consumption and less than optimal resource allocation.

Some satellite positioning system (SPS) enabled subscriber devices to compute position at the subscriber device. In some instances the subscriber device computes location autonomously. In communications networks, however, many subscriber devices request the location information from the network or require assistance information from the network for accurate location computation. This information may include, for example, precise time, frequency calibration, and satellite positioning system navigation information, etc.

As mobile stations roam from base station to base station and network to network, some networks will have the capability to respond to the location request. However other networks will not have this capability. The mobile station will continue to request location information even though the network can not send the pertinent information. Consequently the mobile station will incur undesired current drain and network resources will be inefficiently utilized.

In the exemplary GSM system, not all systems in place have mobile originated location request (MO-LR) capability. If the subscriber device makes a MO-LR and the network does not support MO-LR, the device will not receive the requested information or will receive an error message. Some devices then repeatedly request location information even though the network can not respond. Multiple requests to a network for the information wastes not only the mobile and network resources but also results in unwanted current drain on the mobile station.

Although some networks will be able to respond to the location information request, the mobile station may not support the form or type of data provided in response to a request as there are a plurality of supported formats and protocols. For example, one protocol defines "shape" data which is determined by how the location of the mobile station is calculated and then further what type of data is sent to the device. However, if the network does not provide support for the shape that is supported by the mobile station, the mobile station will not be able to use the data to determine the mobile station location. Subsequent requests by the mobile station uses network resources and increased current drain at the mobile station.

The various aspects, features and advantages of the present inventions will become more fully apparent to those having ordinary skill in the art upon careful consideration of the following Detailed Description of the Invention with the accompanying drawings described below.

DETAILED DESCRIPTION OF THE INVENTIONS

A method in a wireless communication device for suspending re-requests for information from the network is disclosed. The method comprises transmitting a location request message from a mobile station to a network in which the mobile station is in communication with. The next step is determining that the network cannot provide the requested location information to the mobile station. Then, storing an indicator at the mobile station that the network is not capable of providing the requested location information and suspending subsequent transmission from the mobile station of location request messages to the network.

Figure 1:
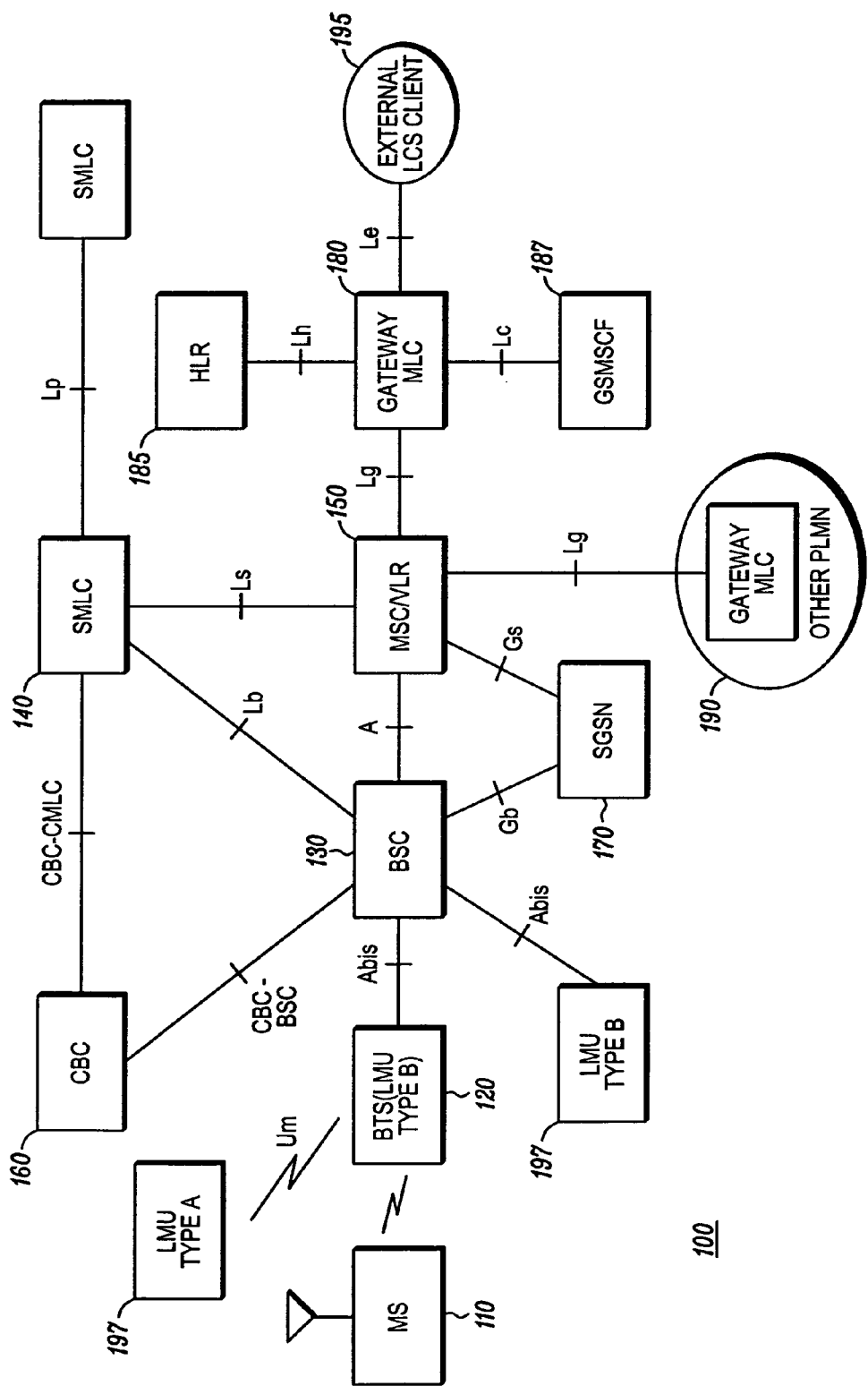
FIG. 1 is an exemplary wireless communications network.
Figure 2:
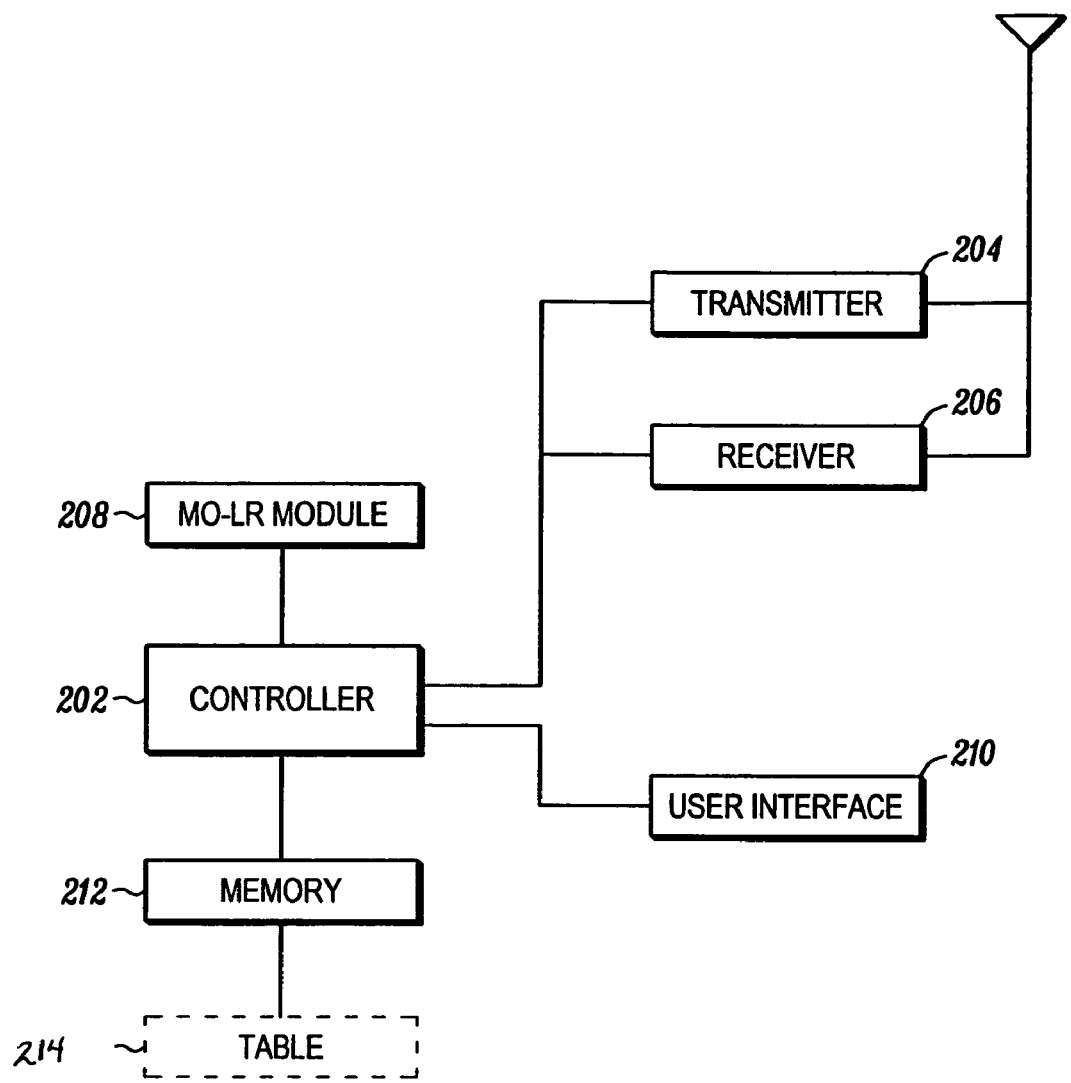
FIG. 2 is an exemplary block diagram of a mobile station.

FIG. 1 illustrates an exemplary wireless communications network in the form of a Global System For Mobile communications (GSM) network 100 supporting wireless communications for mobile wireless communication devices, for example, mobile station (MS) 110, also referred to herein as a mobile wireless communications device or user equipment (UE).

The mobile wireless communications device may be a wireless cellular telephone, or a two-way pager, or a wireless enabled personal digital assistant (PDA) or notebook or laptop computer, or some other radio communications device, anyone of which may be a cellular communications service subscriber device.

The exemplary network 100 comprises generally a plurality of base-station transceivers (BTS) 120 that communicate with a base station controller (BSC) 130, which communicates with a Serving Mobile Location Center (SMLC) 140, a Mobile Switching Center/Visitor Location Register (MSC/LVR) 150 and a Cell Broadcast Controller (CBC) 160. The BSC and MSC/LVR are communicably coupled to a Serving GPRS Switching Node (SGSN) 170. The MSC/LVR is communicably coupled to the SMLC 140, a Gateway MLC (GMLC) 180 and a GMLC in another Public Land Mobile Network (PLMN) 190. In FIG. 1, the gateway MLC is coupled to a Home Location Register (HLR) and to a gsmSCF 187. These and other aspects of GSM and other communications network architectures are known generally. It is to be understood that the present invention may apply to other network types such as wideband code division multiple access (WCDMA), CDMA, or the like that incorporate location services for locating remote or mobile stations.

The exemplary GSM network 100 includes a location service that provides mobile stations with or assists mobile stations in determining their location. Measurement Units (LMUs) 197 which are located at the BTS 120 and at other locations in the network for supporting Enhanced Observed Time Difference (E-OTD) GSM Location Services (LCS), and possibly other location technologies. Location requests may originate from within the network, for example, from a network location server, like an SMLC or from the MS 110. Requests that originate from the MS 110 are called mobile originated location request (MO-LR) in the exemplary GSM system. In the GSM system, a location request operation is invoked by the MS 110 requesting the network to start a location procedure, which is then used to provide the MS 110 a location estimate, location assistance data, transfer to third party or deciphering keys for broadcast assistance data, for example.

In the exemplary GSM communication system, as specified in 4.4.3, the mobile originated location request has a plurality of identifiers associated therewith. The "lcs-MOL-RArg" identifier refers to the MO-LR request parameters which are sent to the network by the MS. The "molr-Type" identifier refers to the type of MO-LR (e.g. LOCATION ESTIMATE, ASSISTANCE DATA and DECIPHERING KEYS). The "locationMethod" identifier refers to the location method. The "lcs-MOLRRes" identifier refers to the MO-LR response parameters which are sent to the MS by the network. The "decipheringKeys" identifier refers to the set of deciphering keys, that contains Current Deciphering Key, Next Deciphering Key and Ciphering Key Flag. These identifiers may or may not be sent in the MO-LR depending on the state of the MS. The network may not understand one or more of the identifiers resulting in a MO-LR failure at the MS 110. In one exemplary embodiment, the MO-LR comprises a "molr-Type" and "location method" as components of the request message.

Exemplary information which may be sent from the network to the MS are covered by 3GPP 04.31 and 3GPP 04.35, which cover general assistance data delivery and positioning methods supported by GSM networks. 3GPP 04.31 covers the Radio Resource LCS Protocol to be used between MS and SMLC for E-OTD and assisted global positioning system (AGPS) method; and 3GPP 04.35 covers the Broadcast Network Assistance data for E-OTD and global positioning system (GPS) method. MO-LR signaling is covered in separate 3GPP standards, primarily 24.030 and 24.080. Broadcast Network Assistance For E-OTD and Global Positioning System (GPS) Methods specifies the broadcast of E-OTD and GPS Assistance Data in an SMS Cell Broadcast (SMSBC) message. The E-OTD Assistance data includes base station coordinate information, and the GPS assistance data includes GPS Differential Correction data for computing location at the subscriber device using E-OTD and GPS technologies, respectively. This information may be sent in response to the location request by the MS 110.

Location requests may also originate from external clients 195, for example, E-911 centers. The LCS architecture has two general variations. In MS-assisted location architectures, location is determined at the network, for example, at the SMLC, with information received from the MS. In MS-based location architectures, location is computed at the MS with information received from the network. The MS 110 location information is then communicated to the requestor or other destination. The exemplary GSM communications network may also support other location services as specified, for example, in 3GPP 04.31 point to point delivery of E-OTD and GPS 3GPP 04.35, Broadcast Network Assistance For E-OTD and Global Positioning System (GPS) Methods.

The GSM communications network architecture of FIG. 1 is only exemplary embodiment and not intended to limit the inventions. The inventions apply more generally to any wireless communications devices that request location information or services, including, for example, 3rd Generation (3G) Universal Terrestrial Radio Access Network (UTRAN), 4th Generation communications networks and among other existing and future communications network and systems. These and other wireless communication devices may support a plurality of location protocols. When location information is requested from the network, either in MS-assisted location determination or MS-based location architecture the information received by the network must be interpretable by the MS 110. In the case of the exemplary GSM system, the network may provide location information in a number of specified data sets called "shapes."

GSM supports seven shape types, each having a different data format that is presented to the MS 110. In the exemplary GSM communication system the seven shapes which may be employed are: ellipsoid point; ellipsoid point with uncertainty circle; ellipsoid point with uncertainty ellipse; polygon; ellipsoid point with altitude; ellipsoid point with altitude and uncertainty ellipsoid; ellipsoid Arc.

The exemplary MS 110 comprises a controller 202, a transmitter 204 a receiver 206 a MO-LR module 208. Optionally the MS 110 comprises a user interface 210. The transmitter 204, receiver 206 the MO-LR module 208 and the user interface 210 are coupled to the controller 202. Memory 212 is also coupled to the controller 202. The memory 212 may be RAM, EEPROM, a SIM card or the like. The memory 212 is capable of storing a location request table 214 and particularly in this exemplary embodiment, a MO-LR failure table. The controller and the MO-LR module will control the data lookup, entry, retrieval, and removal from the table.

The MO-LR module may remove an entry in the MO-LR failure table 214 for example when the network indicates that it can respond to MO-LR request message from the MS. Upon the expiration of a timer and a subsequent send or resend of the MO-LR message and a response to the MO-LR, the MO-LR module may clear or remove the MO-LR failure entry. In one embodiment the MO-LR failure entry may be removed when the MS 110 is powered down.

Figure 3:
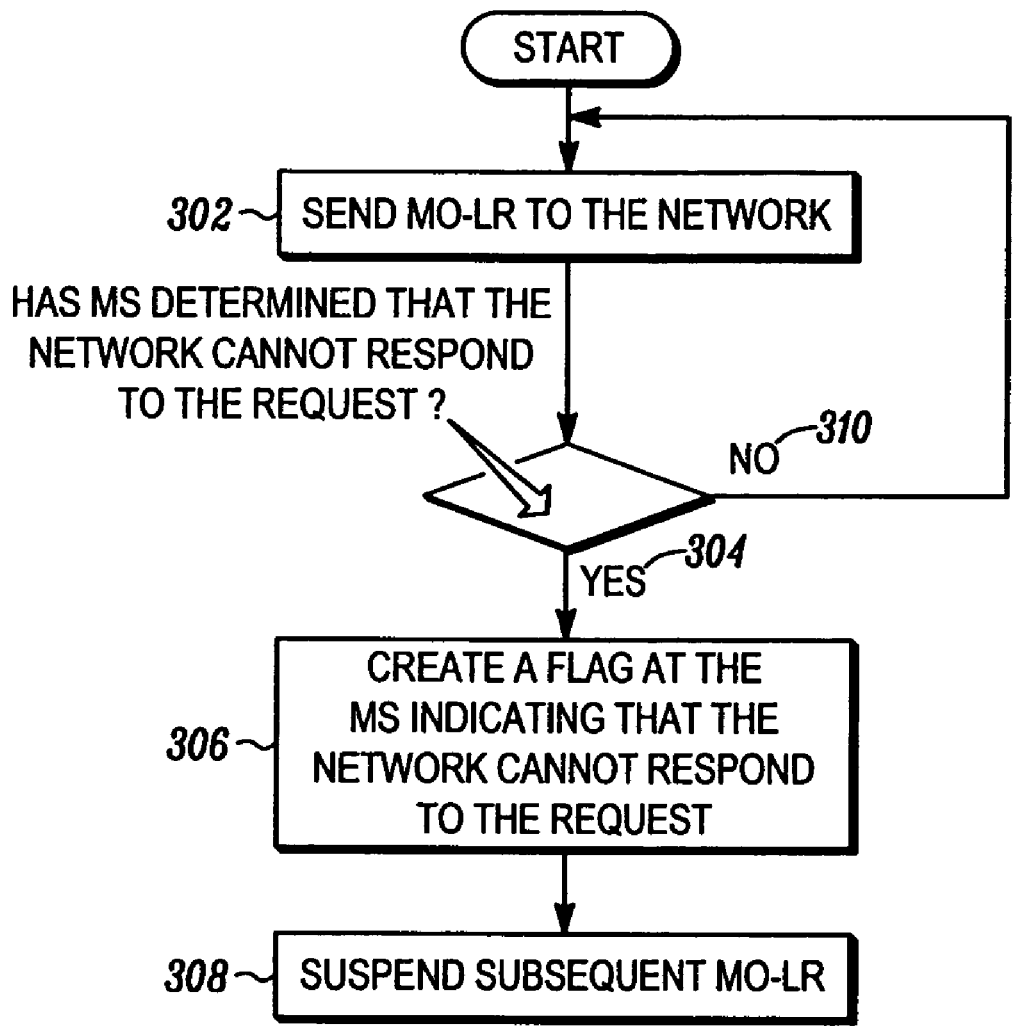
FIG. 3 is an exemplary communications flow diagram.

FIG. 3 is a flow diagram of an exemplary method in a wireless communication device of suspending subsequent requests (re-requests) for location information when the network with which the device is communicating with does not support MO-LR. A subsequent request or re-request is a request for location services or location information while the MS 110 remains within communication with the same network, network entity, group of cells within a network or service provider. In this exemplary embodiment of the method, the MS 110 sends 302 or transmits a MO-LR to the network. Once the MS 110 determines 304 that the network cannot respond to the request for location information, the MS 110 creates 306 a false flag, (i.e. sets a bit) storing the information in a memory of the MS 110. The MS 110 then suspends 308 subsequent transmissions of location requests until a further criteria has been met. If the MS 110 has not determined that the network cannot 310 respond, the MS 110 will continue to send MO-LR.

In one exemplary embodiment, the MS 110 determines that the network cannot or does not support MO-LR requests when the MS 110 receives 104 an indication from the network that the MO-LR could not be fulfilled. In this exemplary embodiment, the step of determining comprises receiving a message at the MS 110 from the network 100 that the request can not be fulfilled. For example, the message received at the MS 110 is a message from the network expressly stating that the MO-LR request can not be fulfilled. In another exemplary embodiment, the network may reply with an error message indicating the network could not understand the location request. In either case this error message may be considered a MO-LR failure.

The error message may also come in a plurality of message. For example, the error message may contain a return error component in the message. In one exemplary embodiment, the error message would be "MOLR method not support." In another exemplary embodiment the error message would be "Type of Shape Not Support." In yet other exemplary embodiments the error message may be one of a "SystemFailure," a "UnexpectedDataValue," a "DataMissing," a "FacilityNotSupported," a "SS-SubscriptionViolation," or a "PositionMethodFailure." These messages are exemplary and it is to be understood that a message indicating that the request from the MS 110 could not be fulfilled will allow the MS 110 to determine that the network entity in communication with the MS will not be able to respond with the desired information to the MS 110.

The absence of any return message, either a direct response or specific error message from the network, may also be the determining criteria indicating to the MS 110 that the network does not have the capacity to respond to a LCS request. The capacity to respond may be permanent or a temporary incapacity to respond which may be due to system issues for example. The MS 110 determines that the network did not respond within a predetermined time frame. The predetermined time frame may be a programmable time frame either programmable at the MS 110 or over the air from a network. This is accomplished in one exemplary embodiment with a timer and in particular a no response timer. In this exemplary embodiment, the step of determining comprises the expiration of the timer at the mobile station and the requested information has not been received from the network.

Once the MS 110 determines that the network cannot or does not support MO-LR requests, the MS 110 will create 306 or store a flag in the memory of the MS 110 indicating that the network can not respond to the MO-LR request. In one exemplary embodiment, the MS 110 stores a FALSE flag in the memory 212 of the MS 110. The FALSE flag may be stored in response to the network message or the time out of the time as discussed above. In example the FALSE flag may be stored in response to receiving "FACILITY NOT SUPPORTED" message. "SystemFailure," message a "UnexpectedDataValue," message a "DataMissing," message a "FacilityNotSupported," message a "SS-SubscriptionViolation," message or a "PositionMethodFailure" message. In one embodiment the flag is created in the MO-LR failure table.

The MS 110 may support the use of one or more shapes to interpret the location information that is sent from the network 100. The shape supported by the MS 110 may not be the shape supported by the network 100 and hence the information will not be sent from the network to the MS 110 as it can not be used and the MS 110 location not determined. For example if the MS 110 has software that can only use ellipsoid point data to determine location and the GSM network supports ellipsoid arc data, the MS 110 can not determine the location thereof. For Example, the network will send the "Type of Shape Not Support" message if the type of shapes the mobile supports does not match with the type of shapes the network supports.

Figure 4:
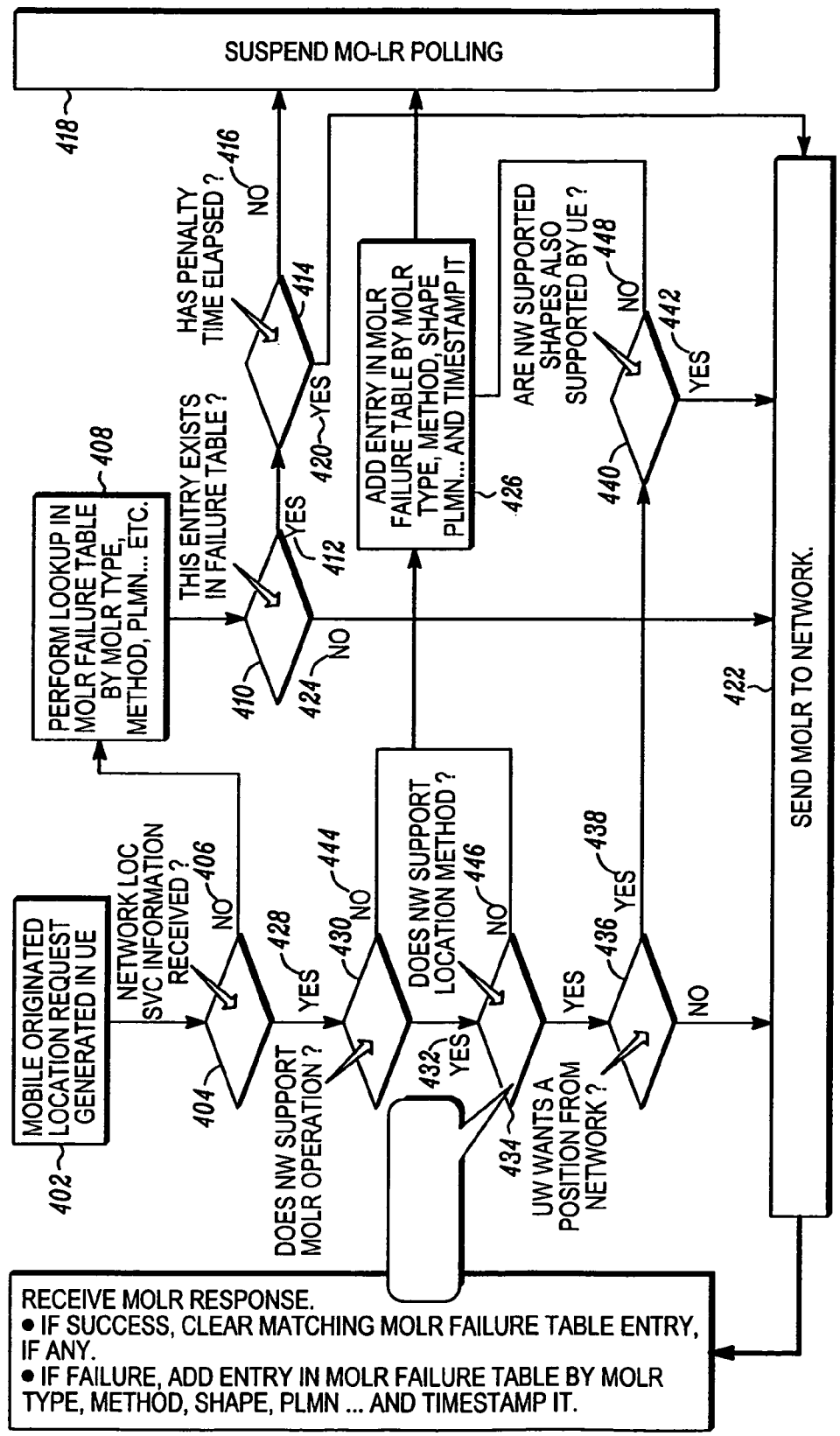
FIG. 4 is an exemplary communications flow diagram.

FIG. 4 illustrates an exemplary flow diagram of a communication network. In this exemplary embodiment a MO-LR is generated 402 at the MS 110. The MO-LR is transmitted or sent to the network. In one exemplary embodiment the method comprises invoking a location request, from the mobile station, by sending a REGISTER message to the network containing the location services mobile originated location request (LCS-MOLR) invoke component. A REGISTER message is sent by the MS 110 to the network to register the mobile with the network, generally when the MS first communicates with the network. A REGESTER message may include a Supplemental Service Message, Direction Message, Protocol Discriminator, Type Identifier, Message Type, Length and Message Components.

The MS 110 determines 404 if the network location services (LCS) information has been received in response to the request. If there is no response 406 from the network, (i.e. there is a MO-LR response failure) the MS 110 performs 408 a lookup in the MO-LR failure table 214. The MS 110 determines 410 if the response failure of the MO-LR request is present in the table 214. In one exemplary embodiment, determining if the response request is present in the table 214 comprises comparing stored information (table 214) at the MS 110 prior to sending a location request to determine whether or not the network has the capability to receive location requests.

If the response failure is present 412 in the MO-LR failure table 214, the MS 110 determines 414 if a penalty timer has expired. If the penalty timer has not expired 416, the MS 110 suspends 418 subsequent MOLR polling. If the MS 110 determines 414 that the penalty timer has expired 420, the MS 110 will send or allow 422 a subsequent MOLR to be sent to the network. If the MS 110 determines 410 that the response failure to the MO-LR request is not 424 present in the table, the MO-LR is sent 422 to the network.

If there is a response 428 from the network, the MS 110 determines 430 whether the network supports MO-LR. If the network does support MO-LR 432, then the MS 110 determines 434 whether the network supports the location method supported by the MS. If the network does support the location method, the MS 110 determines 436 whether the MS wants a position or location from the network. If the MS 110 does want position information from the network 438, then MS 110 determines whether the network supported shapes are also supported by the MS 110. If the network supported shapes are supported by the MS 110, then the MO-LR is sent 422 to the network.

A MO-LR failure is added 426 to the MO-LR failure table when the MS 110 determines that the network does not support MO-LR operation 444, when the network does not support the location method which the MS 110 supports 446, or when the network does not support the shapes the MS 110 supports 448.

A plurality of data may be stored in the MO-LR failure table. In one exemplary embodiment wherein an error message is received from the network indicating that the MO-LR failed, the error message is associated with the public land mobile network in which the MO-LR was sent and stored in the MO-LR failure table. The error message may also be associated with a mobile originated location request type. For example the MO-LR type may be "Locationestimate," "assistanceData" or "Deciphering Keys" for requesting a self location estimate or transfer to third party usage. When the MO-LR is invoked, the MS 110 will perform a lookup in the MO-LR failure table 214 for the MO-LR type. The MO-LR failure table will have stored therein whether the current network communicating with the MS 110 has the capability to respond to the MO-LR of that type.

In one exemplary embodiment, the MS 110 suspends further location requests until a predetermined criteria has been met. For example, the location request may be suspended until the MS 110 roams to a second wireless communication network. The predetermined criteria is the event of roaming to the second network. The predetermined criteria may also be another event that occurs either at the MS 110 or the network. The criteria may be stored in the MO-LR failure table in the MS 110.

In one exemplary embodiment, the MS 110 may roam to a different network (second network) from the previous network (first network). Upon determining that the MS 110 has established communications with a second network, the MS 110 may transmit a MO-LR to the second network. As with the first network discussed above, if there is a determination by the MS 110 that the network can not respond with the requested location information, the MO-LR response failure is entered into the MO-LR failure table.

The type of MO-LR will require different types of data from the network. Location information requested by the MS 110 from the network may give the location of the MS 110 without any assistance data from the MS 110. Other location technologies rely on information provided by the MS 110 as well. MS-assisted Enhanced Observed Time Difference (E-OTD) location technologies, for example, rely upon timing measurements made by mobile stations. In the case of MS-assisted E-OTD technology, some subscriber devices perform neighbor cell measurements in anticipation of E-OTD location requests by the network. The MS 110 will store in the MO-LR failure table that the network can not support E-OTD.

Anticipatory E-OTD measurements taken in idle mode/standby or camped state will, for example, increase current drain, which reduces battery life. Some subscriber device E-OTD software may reduce battery life by as much as 5 or 10 percent, depending, for example, on the frequency with which the subscriber device makes E-OTD measurements, among other factors.

While the present inventions and what are considered presently to be the best modes thereof have been described sufficiently to establish possession by the inventors and to enable those of ordinary skill to make and use the inventions, it will be understood and appreciated that there are equivalents to the exemplary embodiments disclosed herein and that many modifications and variations may be made thereto without departing from the scope and spirit of the inventions, which are to be limited not by the exemplary embodiments but by the claims appended hereto.

What is claimed is:

1. A method in a wireless communication device, the method comprising:
   transmitting a location request message from a mobile station to a network that the mobile station is in communication with;
   determining that the network can not provide the requested location information to the mobile station, comprising receiving an error message at the mobile station from the network in response to the mobile originated location request, wherein the error message is one of "Type of Shape Not Support," "MOLR Method not Support," "SystemFailure," "UnexpectedDataValue," "DataMissing," "FacilityNotSupported," "SS-SubscriptionViolation," or "PositionMethodFailure";
   storing an indicator at the mobile station that the network is not capable of providing the requested location information; and
   suspending subsequent transmission from the mobile station of location request message to the network.

2. The method according to claim 1, wherein the step of determining comprises receiving a message at the mobile station from the network that the request can not be fulfilled.

3. The method according to claim 1, wherein the step of determining comprises the expiration of a timer at the mobile station and the requested information has not been received from the network.

4. The method according to claim 1, creating a FALSE flag at the mobile station in response to the receipt of the error message received.

5. The method according to claim 1, determining comprises receiving an error message at the mobile station from the network, the message containing a return error component.

6. The method according to claim 1, wherein storing comprises creating a FALSE flag at the mobile in response to the receipt of the FACILITY NOT SUPPORTED message received.

7. The method according to claim 1, further comprising the step of establishing communications with a second network that the mobile station is communicating with and
   transmitting a location request to the second network from the mobile station.

8. The method according to claim 1, further comprising
   determining that a no response timer at the mobile station has expired; and
   sending a location request to the network.

9. The method according to claim 1, further comprising comparing stored information at the mobile station prior to sending a location request to determine whether or not the network has the capability to receive location requests.

10. The method according to claim 1, wherein the mobile station location is determined by mobile-assisted location determination or by mobile-based location determination.

11. The method according to claim 1, wherein the location request is a mobile originated location request (MOLR) message.

12. The method according to claim 1, further comprising invoking a location request, from the mobile station, by sending a REGISTER message to the network containing a location services mobile originated location request (LCS-MOLR) invoke component.

13. The method according to claim 1, further comprising associating the error message with a public land mobile network in a table stored in the mobile station.

14. The method of claim 1, further comprising associating the error message with a mobile originated location request type.

15. The method according to claim 14, where the mobile originated location request type is a location data request, a GPS assistance data request, location Estimate, Deciphering Key or transfer to third party.

16. The method according to claim 15, wherein the location data type is an Enhanced Observed Time Difference data request or a OTDOA of data request.

* * * * *